United States Patent [19]

Zimmerman

[11] Patent Number: 4,629,361
[45] Date of Patent: Dec. 16, 1986

[54] INTEGRATED TUBAL BY-PASS FISHWAY

[76] Inventor: Richard J. Zimmerman, P.O. Box 472, Saluda, Va. 23149

[21] Appl. No.: 558,967

[22] Filed: Dec. 7, 1983

[51] Int. Cl.$^4$ .............................................. E02B 8/08
[52] U.S. Cl. ........................................ 405/83; 405/81
[58] Field of Search .................................. 405/81–83, 405/52

[56] References Cited

U.S. PATENT DOCUMENTS

| | | | |
|---|---|---|---|
| 769,910 | 9/1904 | Melbye | 405/83 X |
| 1,569,419 | 1/1926 | Chase | 405/83 |
| 2,059,927 | 11/1936 | Beck | 405/83 |
| 2,174,657 | 10/1939 | Helsel | 405/83 |
| 2,978,873 | 4/1961 | Wardle | 405/83 |
| 3,269,124 | 8/1966 | Leathers | 405/83 |
| 3,772,891 | 11/1973 | Raistakka | 405/83 |

*Primary Examiner*—Dennis L. Taylor

[57] ABSTRACT

An integrated tubal by-pass fishway system for use at dams, obstructions and the like, which enable fish to swim freely and safely upstream or downstream on a near natural level with the original stream bed, by-passing the dam or obstruction by means of a tubal fishway system without the aid of ladders, locks, nets, lifts, etc. Included in this system are several devices that attempt to mimic some of the natural aspects of the original stream without upsetting the present environment, without interfering with present activities on the stream and without requiring constant maintenance. The system is devoid of mechanical devices, although certain devices may be added to monitor fish migration, procure fish samples, etc. Since experience with certain anadromous species of fish indicates that fish ladders, locks, etc. are not adequate for the free migration of these fish, the integrated tubal by-pass fishway system seems to be a viable option, an economically produced and installed system and adaptable to many situations which necessitate the migration of certain fish past dams and obstructions in streams and rivers for the preservation and adequate supply of the species.

6 Claims, 8 Drawing Figures

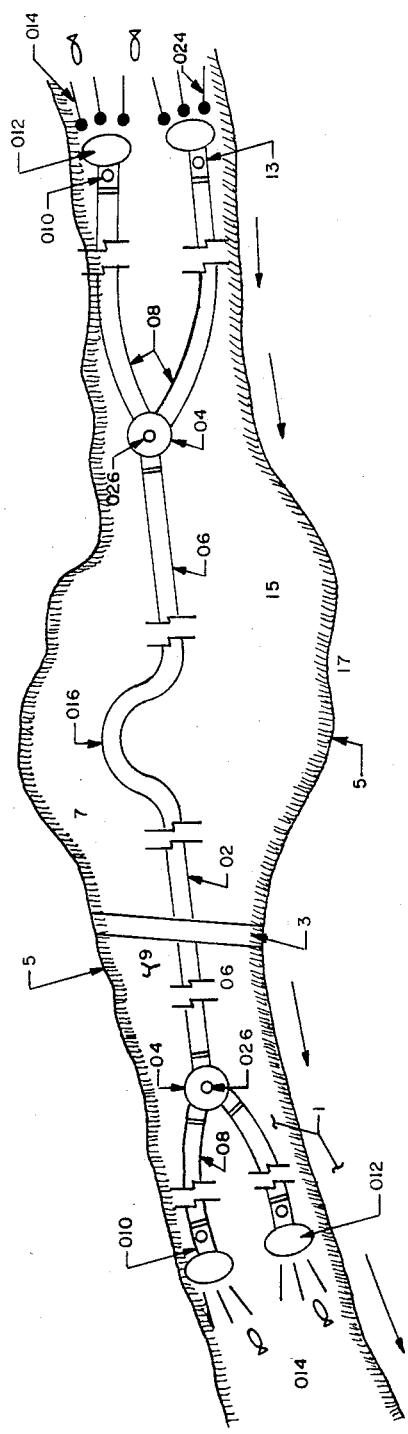
FIGURE I
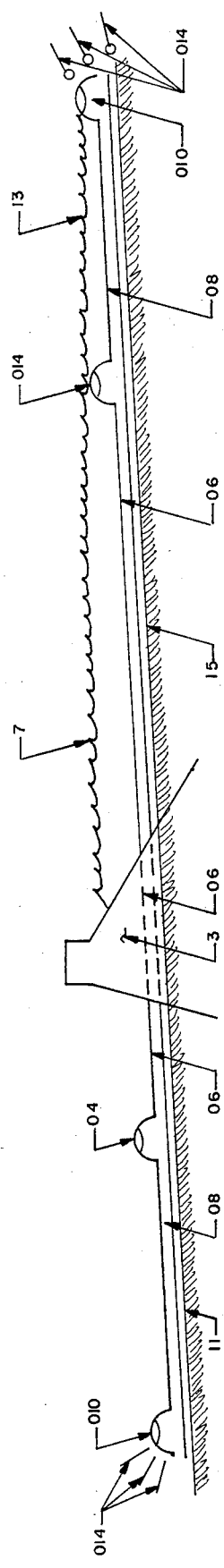
FIGURE II

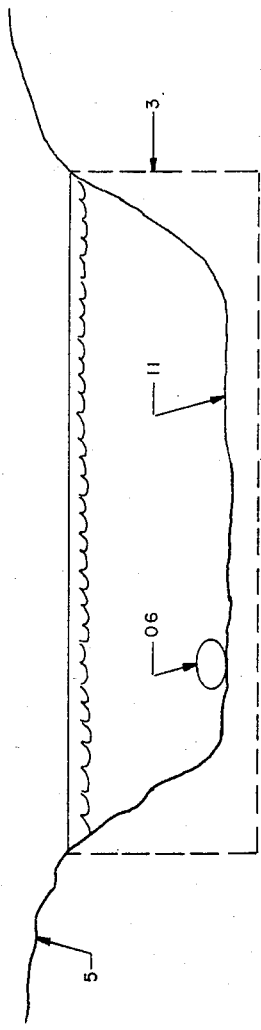
FIGURE III
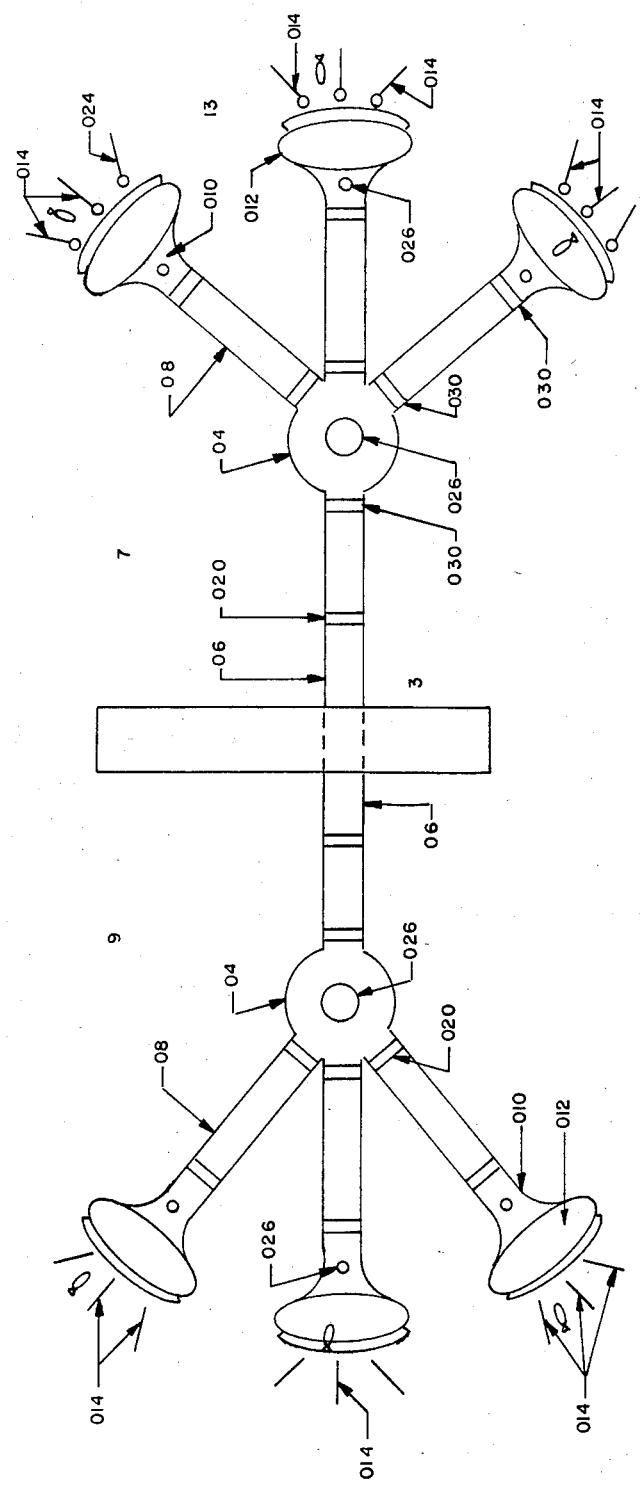
FIGURE IV

FIGURE V
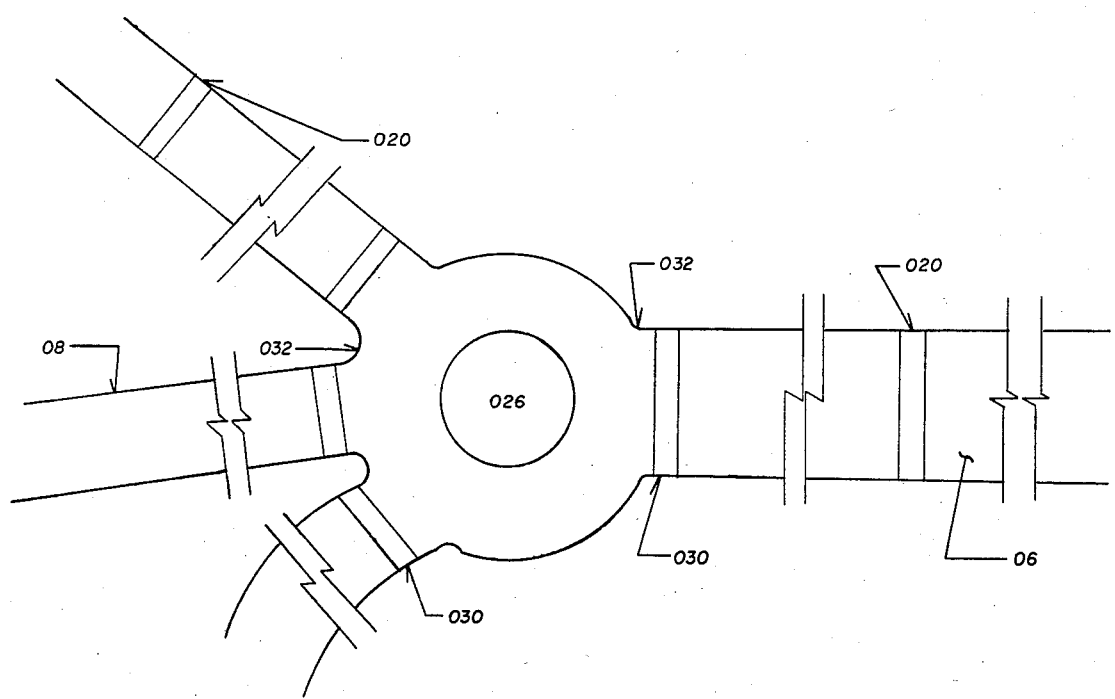
FIGURE VI
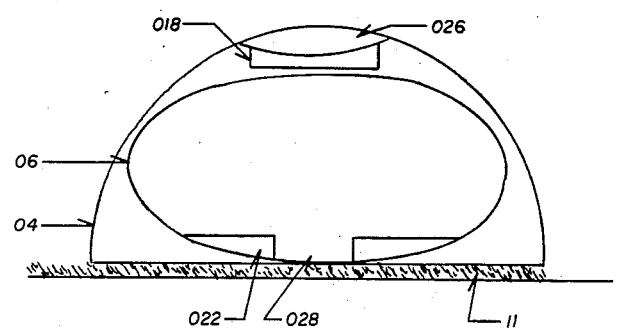

FIGURE VII
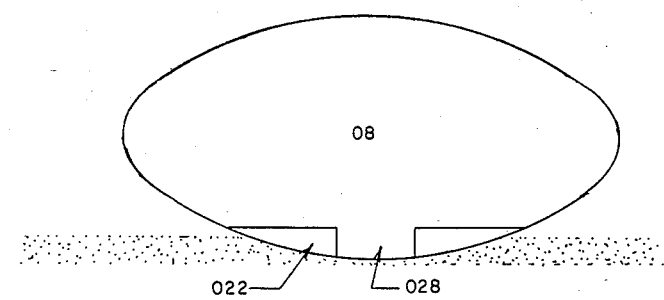
FIGURE VIII
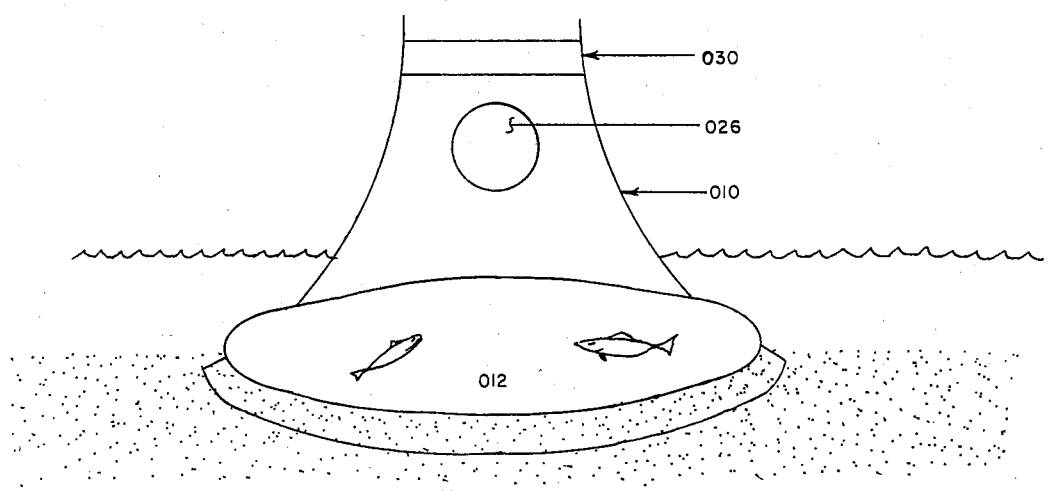

INTEGRATED TUBAL BY-PASS FISHWAY

BACKGROUND OF INVENTION

Man-made obstructions across rivers and streams present constant and serious impediments to the natural migrations of fish. In particular, many fish of certain species, e.g., striped bass and eels, are frequently denied access to their traditional spawning grounds by such obstructions. As a result, their numbers have been rapidly declining. Various attempts have been made to alleviate the situation. Fishways are common devices to help solve the problem.

As an adolescent, in the early 1940's, living along a small Pennsylvania stream, I frequently constructed small dams across the stream to create a "swimming hole" until a foul storm would quickly demolish my efforts. However, during the short time between storms when the little dam was functioning, I devised a way to permit the fish (especially, trout) to ford the obstruction. (My father warned me about the legal problems of obstructing a stream, wasting time and creating a nuisance!) Having built the dam across the stream with sand bags and rocks and put in a over-flow pipe, I realized the fish could not navigate the strong stream of water up and through the pipe. In order to by-pass the problem, I dug a small trench on the same level of the stream bed along the bank extending from the dam to the "fresh water" above the lake area. The trench then opened into the "fresh water" of the stream. At the dam site, I used another discarded piece of terracotta pipe which I sand-bagged in the trench. Then I continued the trench down stream into the normal flow of water. Since the dam was never more than three or four feet high and about twenty-five feet long, the by-pass system was not a major inconvenience. However, I had the satisfaction of watching the trout and minnows swim up and down the by-pass. I also had the good fortune of placating my parents until another chore in the field demanded my attention!

The intervening years since adolescence have been far removed from the days of building swimming holes. However, it was by chance that I heard on the radio a few months ago that Virginia was interested in replenishing its striped bass species. But, the many dams and obstructions on the rivers and streams prevented migration of the fish to their traditional spawning grounds. It was a reminder of my parents' admonition and my youthful attempts to have a legal swimming hole that spurred me to answer the call of the Virginia dilemma.

Field Search: Prior articles on patents of interest are particularly exemplified by U.S. Pat. No. 1,569,419 (Chase) and include U.S. Pat. Nos. 1,798,238 (Wass), 3,269,124 (Leathers), 3,772,891 (Raistakka) and 4,260,286 (Buchann).

SUMMARY OF THE INVENTION

This invention relates to fishways that are constructed on streams and rivers to facilitate the migration of fish past the obstruction or dams. However, the general object of this invention is to provide a novel, integrated and improved system to facilitate and expedite fish migration in streams and rivers which have obstructions or dams across them. In particular, this novel system attempts to accomodate those species of anadromous fish that have shown neither the ability nor the inclination to utilize the various migratory systems or devices already in place and to provide a system that is continually operatable and requires minimal maintenance.

A general purpose of this invention is to provide several novel methods and/or devices within the fishway system which attempt to mimic some of the natural characteristics of a stream or river. These natural characteristics encourage the migrating fish to pass through the tubal by-pass system and thereby, pass through the obstruction or dam on their way to and from their spawning grounds and haunts.

A novel innovation in this fishway system is the use of a transparent and/or translucent tubal by-pass system that extends from below the dam, through the dam or obstruction (or around the side of the dam when necessary or feasible), and beyond the lake water confined behind the dam into the fresh flowing water of the river or stream. The object of the clear, transparent tube (transparent is preferred to translucent if construction is possible) is to provide natural light through the greater portion of the tube, thereby encouraging fish to enter the tubal by-pass system and continue their migration unimpeded.

Another aspect in the tubal by-pass system which is useful and novel in this fishway is the use of centralizing fish manifolds. These devices provide a central collection point for the fish intake/exit manifolds which are located in various currents of the river where fish normally travel.

The fish intake/exit manifold is still another device of the tubal by-pass fishway system which is novel to this system. This device provides coverage for a body of water, especially rivers and streams, to facilitate the migration of fish through the tubal by-pass system and hence past the obstructions on the rivers. The fish intake/exit manifolds may have either single large portal or several smaller portals which permit the entry or exit of fish using the main tubal fishway system.

Fish lead-in or fish and current diversion system is still another novel device within the tubal fishway system. The lead-in or diversion system directs some of the water in the stream or river and the fish travelling in the currents through the portals on the fish intake/exit manifolds; and thence, the fish enter or exit the tubal by-pass system. These lead-ins or diversions act like rays, emanating out from a central source, viz., the fish intake/exit manifolds, collecting and guiding the fish through the tubal fishway system. These diversions also extend the coverage of the fish intake/exit manifolds. However, these lead-ins do not interfere with projects at the dam or navigation on the stream; nor do they affect abnormally high water since they do not extend above the normal flow of the water.

A further purpose of this invention is to provide a novel fish attraction within the tubal by-pass system. The installation of a fish lure and a dispensing device at the entrance and within the tubal system may encourage fish to utilize the migratory system. The lure is preferably fish oil that is placed in cannisters and dispensed into the tubal system via a drip system. These cannisters may be periodically refilled when migrations begin, especially during the spawning season. The scent of fish oil within the system lures the migrating species through the tubal fishway system.

BRIEF DESCRIPTION OF THE DRAWINGS

The accompanying drawings schematically illustrate the apparatus of the invention, as follows:

FIG. I is a top plan view of a river having a dam extending across it and a by-pass fishway terminating on opposite sides of the dam;

FIG. II shows a vertical section of what is shown in FIG. I, taken between the left bank of the river and the fishway, and showing a side view of the fishway;

FIG. III is an enlarged top plan view of a section taken on the line III—III in FIG. I;

FIG. IV is an enlarged top plan view of a modified form of the fishway;

FIG. V is a further enlarged top plan view, partially brokenaway, of a centralizing fish manifold shown in FIG. IV;

FIG. VI is a still further enlarged section on the line VI—VI in FIG. IV;

FIG. VII is an enlarged cross section view of tubal by-pass on the line VII—VII in FIG. IV;

FIG. VIII is an enlarged top plan view of a fish intake/exit manifold on the line VIII—VIII in FIG. IV.

DETAILED DESCRIPTION OF PRESENTLY PREFERRED EMBODIMENTS

Most migrating fish seem to have a highly developed sense of direction and smell. In particular, anadromous fish exhibit an uncanny ability to return to their birth place to spawn and thereby replenish their species. Many of these anadromous fish display an unflagging energy and determination to pursue their migratory instincts in spite of impossible obstructions. However, some species, especially striped bass and eels, apparently are not suited to navigate some fishways presently in use in the pursuit of their migratory instincts. For decades, some streams and rivers have had obstructions or dams across their waters from bank to bank. Yet, anadromous fish still come back in an attempt to migrate to their ancestral grounds for the preservation of their species.

The purpose of this invention is to provide a facility or fishway system 02 with several features which attempt to simulate some of the natural characteristics of a stream before the installation of a dam. This invention also attempts to utilize some of the natural abilities of migrating fish to aid them in the fulfillment of their migratory missions. Thus, the combination of a simulated natural fishway system in conjunction with the natural instincts of the anadromous species of fish contribute to the preservation of these migrating fish.

The integrated tubal by-pass fishway system 02 is novel in several aspects. The main by-pass fish tube 06 is a continuous by-pass fishway, consisting of a corrugated, transparent/translucent tube or conduit. This tube may be fiberglass or some type of material having the required qualities necessary for the intended environment and which will readily transmit light through it. Although the tube 06 may have any cross sectional shape, the tube 06 preferably should be elliptical in its cross sectional shape. The longer dimension of the ellipse should extend horizontally. The size of the main tube 06 may vary to accomodate specific needs; however, it should be at least four feet across horizontally and three feet high to accomodate fish that may weigh approximately thirty pounds. This tube 06 must be installed on the stream bed 11. However, it may also be placed in a shallow trench in the stream bed 11. The tube 06 must, however, follow the approximate grade level of the original stream bed 11 in its entirety. That section of the main tube 06 which passes through the dam 3 (or which may circumvent the dam structure when it is not feasible to pass through the dam) must also follow the approximate grade level of the orginial stream bed 11. That section of the tube 06 which passes through the dam 3 need not be transparent for obvious reasons. However, the size, corrugation and configuration of the tube 06 should remain the same as those portions of the main tube 06 which extend beyond the upper and lower portions of the dam 3. An appropriate collar should be installed around the main tube 06 where it enters and exits the dam 3 in order to ensure a watertight installation. The tube 06 may be constructed in sections; in which case, an appropriate watertight connection collar 030 should be used to make the connection. The main by-pass tube 06 must be sufficiently anchored to the stream bed 11. However, the anchoring system 020 should cover as little of the tube 06 as is feasible. The anchor system 020 may be a simple but effective strap or cable which girds the tube 06 and is securely anchored in the stream bed 11. The main by-pass tube 06 must also be able to withstand the pressure of water confined behind the dam 3. This pressure may vary with the depth of the water; however, the tube 06 must also be sufficiently strong to withstand occasional flood conditions on the stream. The upper and lower portions of the by-pass tube 06 may be located and installed on the stream bed 11 at any point, whether it be along the banks 5, mid-stream, etc. One or more tubal by-pass systems 02 or enlarged systems may be used to accomodate varying bodies of water, fish populations or other needs. The main by-pass tube 06 may be constructed from any suitable material as noted above; however, the entire fishway system must be able to transmit light to the interior of the system and be able to withstand various stresses and pressures and ordinary chemical changes, including those changes caused by light. The corrugation of the inside portion of the main by-pass tube 06 and the entire tubal system 02 which includes the various integrated structures within the tubal system should have a sufficiently deep corrugation on the floor or bed of the system (approximately two to three inches), so that a collection of sediment can build up in the corrugation to simulate a natural stream bed. The sediment collected in the corrugation can also collect fish odors and provide a means of holding some of the fish oil lure 018 that is dispensed into the system 02; and finally, the corrugation can provide a fearless guide-way and path for the migrating fish. The main by-pass tube 06 should also have mini breakers 022 installed within the tubal system 02. These mini breakers 022 should be approximately two to three inches high and have a breach 028 at their mid-point approximately six inches across. These breakers 022 should be placed three to four yards apart on the floor of the main tube 06 and in the secondary connecting tubes 08. The purposes of these breakers 022 are to provide a tumbling effect in the water within the tubal system 02, slow the flow of water within the system 02 and help sustain water depth within the tubal fishway system 02. The ends of the tube 06 are connected to the centralizing fish manifolds 04. One 04 is located in the upper area of the lake bed 15 and one 04 is located below the dam 3. Each tubal by-pass system has at least two centralizing fish manifolds 04. Secondary connecting tubes 08 connect the centralizing fish manifolds with fish intake/exit manifolds 010 through which the fish enter or leave the fishway system. The fish lead-ins 014 or fish and current diversions complete the major portion of the tubal by-pass fishway 02.

Centralizing fish manifolds 04 are an integral part of the tubal by-pass fishway system 02. This device, which is also transparent or translucent, is installed at the end of the main by-pass tube 06 on the lake bed 15 in the upper portion of the lake area 17 behind the dam 3. Another centralizing fish manifold 04 is installed below the dam 3 at the end of the main by-pass tube 06 in the stream bed 11. (The centralizing fish manifold 04 is installed at the end of the turbulent water 9 below the dame 3 in those situations where there are large, high spillways and/or turbines in the dam.) Where there is little turbulent water below the dam 3 during normal flow periods, the centralizing fish manifold 04 may be located near the dam. The centralizing fish manifold 04 located in the lake bed 15 behind the dam 3 must be watertight to prevent siphoning of lake water 7 into the tubal by-pass system 02; to prevent unacceptable water pressure at the intake/exit fish manifold 010 below the dam 3; and the device 04 must be watertight to avoid mixing lake water 7 with the fresh flowing water 13 from above the lake area 17. Were the fresh water 13 from above the lake area 17 to mix together with the water of the lake 7 and enter the tubal by-pass system 02, the migrating fish may be confused as they enter the fishway system 02 at the fish intake/exit manifold 010 located below the dam. Thus, this system must be watertight throughout the entire tubal by-pass system 02. The centralizing fish manifold 04 must be constructed of materials, such as fibre glass, which is both transparent/translucent and can withstand the water pressures in the fishway area during normal and abnormal conditions. This device 04 should have a configuration similar to an igloo, a corrugated floor and an inspection and clean out door 026 on top. The structure 04 must be securely anchored to the stream bed 11. It 04 should be sufficiently large to accomodate the entry of the main by-pass tube 06 on one side and the entry of one or more secondary tubes 08 on the opposite side. The apertures on this structure 04 which connect to the main by-pass tube 06 and to the secondary connecting tubes 08 should have flared portals similar to a large funnel whose wide end is opened to and permanently bonded to the structure 04; the smaller end of the funneling device opens into the tubes, 06 and 08 and are securely connected together with a watertight seal. These flared, funnel shaped portals 032 are so constructed and located on the centralizing fish manifolds 04 as to accomodate various size tubes 06, 08 and to provide quick and simple installation of the tubal system or for inspection, maintenance or repair. The inspection and clean-out door 026 which is installed on the top of the structure 04 must be watertight. The door 026 may be used as an entry for installing the fish lure system 018 or to replenish the fish lure cannister periodically or to install fish monitoring mechanisms, etc. The secondary connecting tubes 08 should be elliptical, transparent/translucent, corrugated tubes or conduits. These tubes 08 should be large enough to accomodate fish weighing approximately thirty pounds. Although the tube 08 may have any cross sectional shape, the tubes 08 preferably should be elliptical in their cross sectional shape. The longer dimension of the ellipse should extend horizontally. The size of the tubes 08 may vary for specific needs; however, they should be at least three and a half feet across horizontally and two and a half feet high. These tubes 08 should also have mini breaker 022, approximately three inches high, installed on the corrugated floor of the tubes 08. The breakers 022 should have breaches 028 approximately six inches wide, spaced approximately two to three yards apart within the tubes 08. These secondary tubes 08 have one end connected to the centralizing fish manifold 04; and the other end is connected to the fish intake/exit manifold 010. These secondary connecting tubes 08 must be securely anchored to the stream bed 11 and follow the grade level of the stream bed 11.

Fish intake/exit manifolds 010 are structures or devices having a basic funnel shape. However, the wider orifice has a flared elliptical aperture 012 with the longer dimension of the ellipse being the horizontal. Again, this device 010 should be transparent/translucent. The device must be sufficiently strong to withstand flood waters and the usual debris floating in a river or stream. The structure 010 also should have a corrugated floor to collect sediment to provide a simulated natural stream bed. The device 010 must be located above the dam 3 and beyond the lake water 7 and securely anchored in the fresh flowing water 13 above the lake area 17. A second fish intake/exit manifold 010 is installed below the dam 3. It 010 must be securely anchored in the stream bed 11. The structure 010 is located in currents beyond the turbulent water 9 in the normal stream flow. The large, flared opening or portal 012 is the entry or exit for the fish using the tubal by-pass system 02. The lip of the portal 012 on the bottom portion of the fish intake/exit manifold 010 is raked downward several inches so as to be embedded in the stream bed 11. The smaller orifice of the funnel shaped fish intake/exit manifold is so constructed as to accomodate the connection of the secondary tube 08 leading to the centralizing fish manifold 04. The portal on the fish intake/exit manifold 010 may be a single, large elliptical orifice 012 or it may have several smaller openings; however, these portals 012 must be large enough to accomodate the free movement of fish weighing thirty pounds. The fish intake/exit manifold 010 may have approximate dimensions of eight to ten feet across at the portal 012, three feet high and four feet in depth.

The fish portal(s) 012 on the fish intake/exit manifolds 010 located in the fresh flowing water 13 above the lake area 17 must be oriented upstream, facing the incoming water to facilitate the entry of the migrating fish coming down stream. Conversely, the portal(s) 012 on the fish intake/exit manifolds 010 located below the dam 3 must be oriented downstream to facilitate the entry of the migrating fish upstream. A clean-out and inspection door 026 may be installed on top of the fish intake/exit manifold 010.

A deflecting device 024 should be installed in front of the fish portal 012 which is located in the stream bed 11 in the fresh flowing water 13 above the lake area 17. The device 024 should be sufficiently strong to prevent large pieces of debris from entering or damaging the fish intake/exit manifold 010. The deflector 024 should not interfere with the free entry or exit of migrating fish using the fishway 02. A deflecting device 024 may be installed on the fish intake/exit manifold; however, a device apart from the structure 010 is preferred. A simple protection device may be a series of sturdy poles, firmly anchored in the stream bed 11 several feet from the portal on the fish intake/exit manifolds 010. Deflecting devices 024 are necessary only at the fish intake/exti manifolds 010 located above the lake area 17. No deflecting devices 024 are necessary at the fish intake/exit manifold 010 below the dam 3.

Lead-ins 014 or fish and current diversions are simple constructions of rock, concrete or other materials that are anchored in the stream bed 11 and emanate out from the fish intake/exit portals 012 on the fish intake/exit manifolds 010 like so many rays. These lead-ins 014 may vary in length and height in relationship to the size of the body of water. However, these lead-ins 014 should permit the movement of water over them while maintaining some direction for the water and the migration fish into the tubal by-pass fishway system 02 during normal water levels. These diversions 014 may be positioned toward the bank 5 of the stream where many migrating fish often travel; and they may be oriented toward the channel of the stream or river 1. These lead-ins 014 act like a fan, greatly and simply extending the coverage and usefulness of the fish portals 012 and the entire tubal by-pass fishway system 02.

A simple but effective fish lure 018 in the form of fish oil is used to attract fish into the tubal by-pass fishway 02. The fish oil is contained in cannisters which are installed within the system 02, preferably under the clean-out and inspection doors 026 on the fish intake/exit manifolds 010 and the centralizing fish manifolds 04. The lure 9 fish oil) is dispensed into the water within the tubal system 02 via a drip system. The cannisters which hold the lure may be periodically refilled. The scent of fish oil within the system 02 lures the migrating species through the tubal fishway system 02.

The tubal by-pass fishway system 02 may be completely closed off by the installation of doors (not shown) on the fish portals 012 on the fish intake/exit manifolds 010.

In large installations, where the lake area is long 17, the main by-pass tube 06 and the secondary connecting tubes 08 may have inspection and clean-out doors (not shown) installed on them. However, these devices must be watertight and not compromise the usefulness of the system 02 in any way.

The integrated tubal by-pass fishway system 02 has several features which are advantageous for the migration of fish past obstructions 3, especially certain species of anadromous fish, in streams and rivers which have dams 3 that completely impede the natural migration of fish. The integrated tubal by-pass fishway 02 herein disclosed provides several important advantages over other structures heretofore proposed for the migration of fish past dams and obstructions on streams and rivers. First, the present integrated tubal by-pass fishway 02 attempts to mimic some of the natural migratory environment of the river or stream which has been obstructed by a dam. Secondly, the tubal fishway system 02 may be conveniently located or relocated where and when the need arises. Another advantage of this tubal by-pass system 02 is the possibility of constructing this system with modern modular techniques. The tubal by-pass fishway 02 may be economically constructed and reproduced in a factory setting. The system 02 can also be easily enlarged or reduced without changing the basic structures within the system. The installation of this present tubal by-pass fishway 02 can be performed with a minimum of construction equipment since it lends itself to incorporation in existing dams and may circumvent large existing dams with relative ease at modest expense. This system 02 is durable, readily repairable, easily and economically maintained and quickly replaced in whole or in part. This tubal by-pass fishway 02 places little stress on the aquatic environment and the fish that utilize the system; and it permits the continued, uninterrupted use of the stream or river. This tubal fishway 02 is readily adaptable to varying and various physical aspects of rivers and streams, including conditions, sizes and shapes of the streams and rivers. When this integrated tubal fishway system 02 is properly installed and maintained in the stream, it should provide adequate coverage as a fishway through obstructions or dams. This present fishway system 02 is essentially simple with a minimum of mechanical devices.

While present preferred practices and embodiments of the invention have been described and illustrated, it is understood that various modifications may be made within the scope of the following claims.

I claim:

1. A fishway in a stream of water having an obstruction across it, comprising a conduit extending past the obstruction below and generally parallel to the surface of the stream, openings at opposite ends of the conduit at least one of said openings being positioned on the upstream side of the obstruction beyond the backwater caused by the obstruction, and other of said openings being positioned downstream of the obstruction where there is relatively little local turbulence, whereby fish may enter the conduit with said openings being located a sufficient distance above and below the obstruction so as to permit fish to enter or exit the system into the natural flow of the stream and swim through said conduit past the obstruction, and said conduit having translucent walls, thereby permitting natural light passing through the water to illuminate the water within said conduit and thus encourage fish to swim through it.

2. A fishway according to claim 1, in which the conduit is principally constructed of fiberglass or such material having the required qualities necessary for the intended environment and which will readily transmit natural light through it and thus encourage fish to swim through it.

3. A fishway according to claim 1, in which the conduit comprises sections of corrugated pipe, whereby sand may be trapped along the bottom of the pipe.

4. A fishway according to claim 1, in which the conduit has branches at its opposite ends and openings into the natural flow of the stream at the end of each branch.

5. A fishway according to claim 1 in which a lead-in or fish and current diversions are contiguous to and unattached to the ends of said conduit.

6. A fishway, according to claim 1, in which the conduit contains a fish lure in the form of fish oil taken from or recognized by the species of fish utilizing the fishway.

* * * * *